Figure 3:
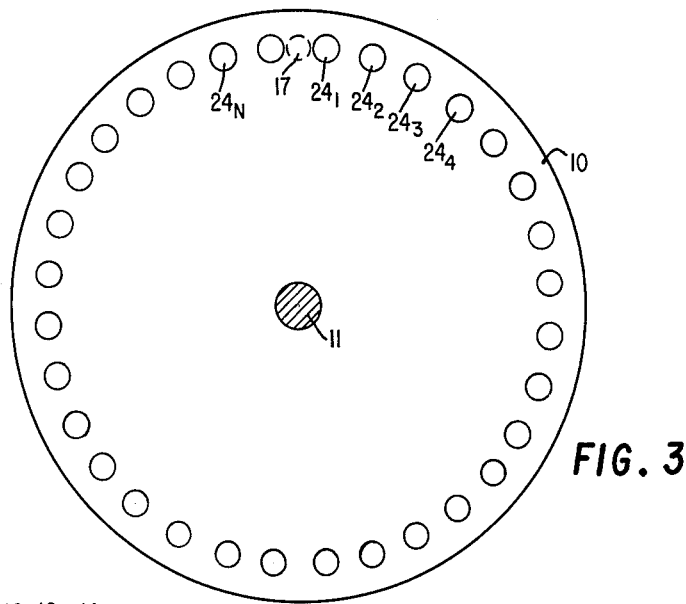

Aug. 24, 1965  J. L. GRAY  3,202,180
FLUID PULSE GENERATOR
Filed Feb. 8, 1963  3 Sheets-Sheet 1

INVENTOR
JAMES L. GRAY
BY *Griffin and Stokes*
ATTORNEYS

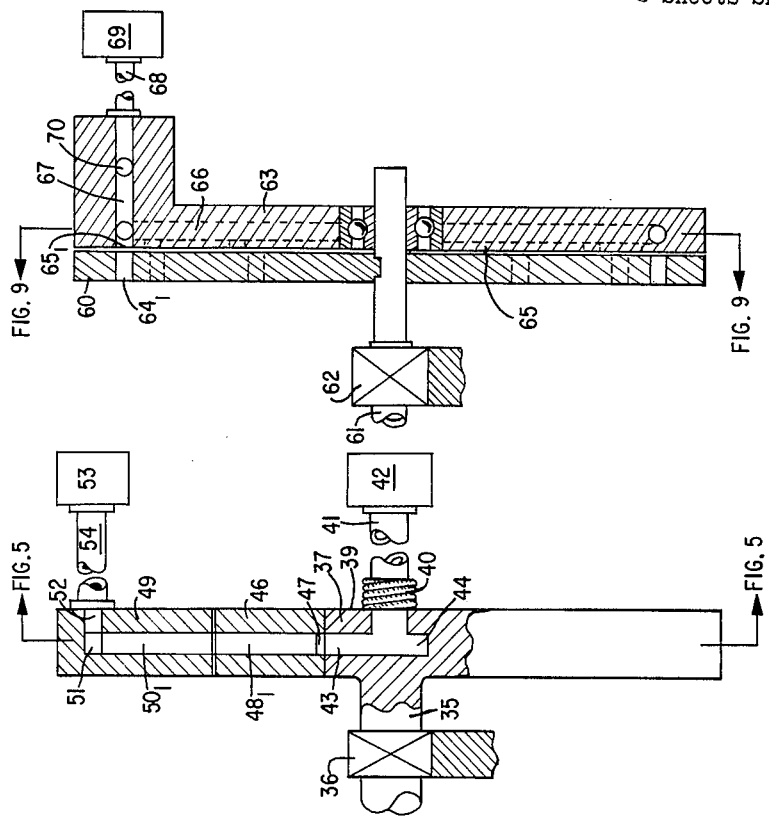
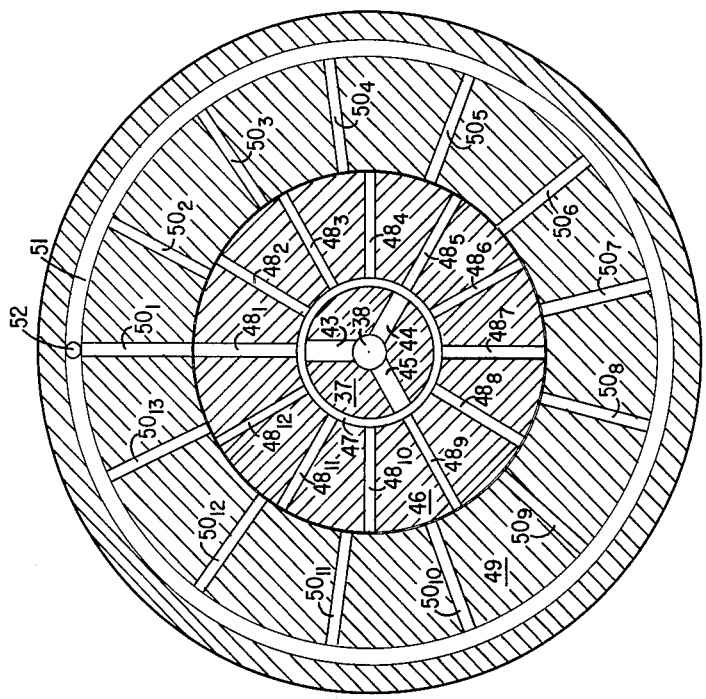

Aug. 24, 1965   J. L. GRAY   3,202,180
FLUID PULSE GENERATOR
Filed Feb. 8, 1963   3 Sheets-Sheet 3

United States Patent Office 3,202,180
Patented Aug. 24, 1965

3,202,180
FLUID PULSE GENERATOR
James L. Gray, Maple Glen, Pa., assignor to Sperry Rand Corporation, New York, N.Y., a corporation of Delaware
Filed Feb. 8, 1963, Ser. No. 257,336
9 Claims. (Cl. 137—625.15)

The present invention relates to an analog-to-digital converter using fluid means, and more particularly, to a novel fluid pulse generator.

Analog-to-digital converters are employed in many and varied fields. Two broad applications of these devices are in the areas that are concerned with automatic position control and automatic position indication. It is very often necessary to have a device that translates the rectilinear position of a carriage or the angular position of a shaft into a corresponding digital signal. One particular method for performing this function in the prior art is to impose an arbitrary zero or a datum point with respect to which the actual position of the element is referenced. In many of the prior art incremental devices employing just such a reference point, electrical brush contacting means cooperate with alternating zones of insulating and conducting segments to generate a train of electrical pulses on an output conductor as the machine element moves toward or away from the established reference position. Consequently, if the initial position of the element is known, its position both during and after motion can be determined by counting the number of pulses generated during its motion. The initial position is normally the fixed reference point from which all counting begins. An alternative means in the prior art for generating electrical pulses is the use of a magnetically recorded clock pulse track which is sensed by an appropriate pick-up head, as in the manner of determining address locations on a magnetic drum memory in the computer art.

The present invention may be used in such an incremental position indicating device since it generates a train of pulses in response to the motion of a machine element. However, these pulses are developed in a fluid medium instead of electrically as in the prior art. The resulting simplicity of construction provides the advantages of low cost, long life, and reliability as compared to the prior art electrical pulse generators. One other highly advantageous feature of the present invention is that it is particularly adapted for use in the new and rapidly expanding pure fluid art which is examplified by the pure fluid amplifier. A pure fluid amplifier is one wherein the direction and usable energy of a fluid power jet stream is controlled by the energy contained in a smaller fluid control jet stream. The present invention, with its fluid pulse output, is therefore ideally suited to supply a fluid control stream in a pure fluid system.

Accordingly, one object of the present invention is to provide a pure fluid pulse generator operated by mechanical motion.

Another object of the present invention is to convert rotating shaft motion into a pulse train by fluid rather than electrical or electronic means.

A further object of the invention is to provide means whereby the angular rotation of a shaft may be translated into digital fluid signals.

Still another object of the present invention is to provide means to directly convert mechanical motion into fluid signals without the need to interpose additional transducers.

Another object of the present invention is to provide a pure fluid pulse generator utilizing a vernier principle for generating a large number of pulses from a physically small unit.

Figure 1:
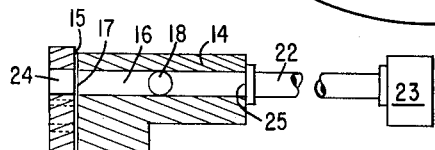
Figure 2:
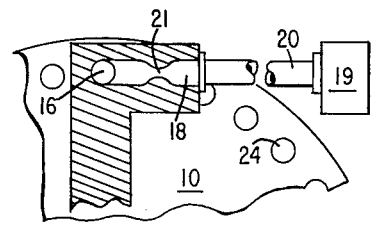
Figure 4:
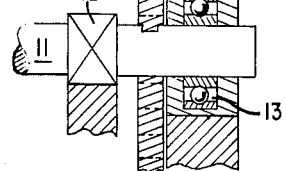
Figure 9:
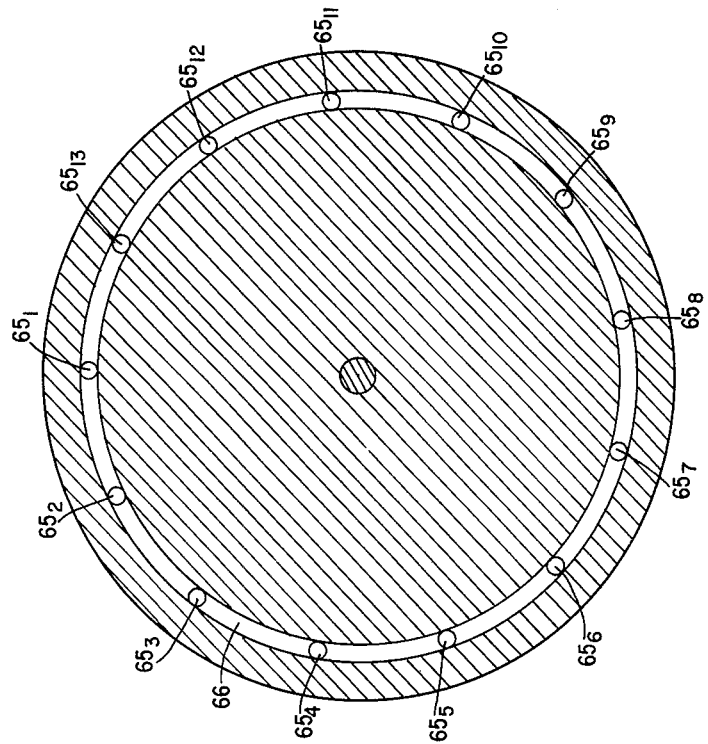
Figure 8:
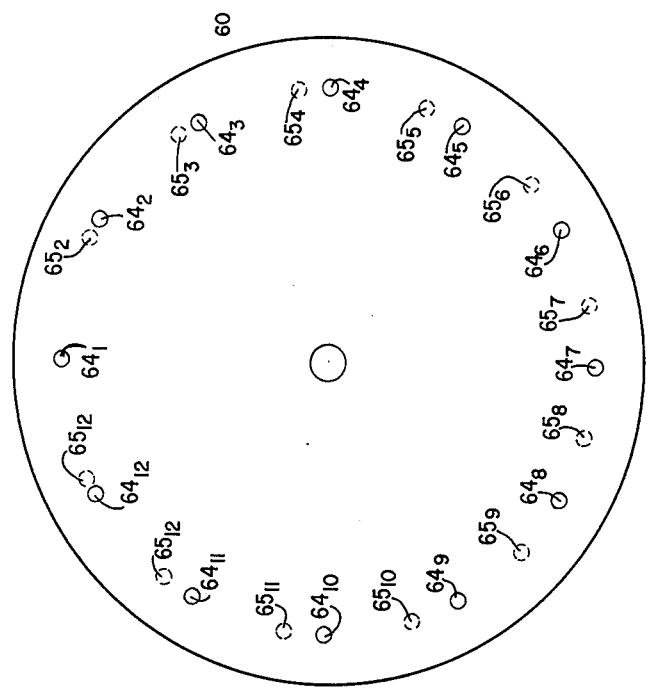

These and other objects of the present invention will become apparent during the course of the following description, which is to be read in conjuntcion with the drawings, in which:

FIGURES 1, 2, and 3 show various views and details of a first embodiment of the present invention;

FIGURE 4 shows details of a modification of said first embodiment;

FIGURES 5, 6, and 7 show various views and details of a second embodiment of the invention employing a vernier principle for generating a large number of pulses for a small physical displacement; and FIGURES 8 and 9 show various views and details of a modification of said second embodiment.

FIGURES 1, 2, and 3 show a first embodiment of the invention for converting the rotation of a shaft into a train of pure fluid pulses, one pulse for each small incremental degree of rotation. As best shown in FIGURES 1 and 2, a disc 10 is keyed onto a rotating shaft 11 which in turn is suported in bearings 12 and 13 such that both axial and transverse play is held to a minimum. Bearing 13 may actually be held in a block 14 which is disposed adjacent to the rotating disc 10. Disc 10 is maintained with a small clearance 15.

Within block 14 is a fluid feed pipe or channel 16 which communicates with a port 17 opening onto the surface of the block adjacent the disc 10. Channel 16 forms the cross member of a T-feed path whose stem or center leg comprises another fluid channel 18. Channel 18, in turn, is connected to some fluid supply 19 via a conduit 20 which may or may not be external to block 14. Source 19 may be a pump or compressor for supplying fluid under constant pressure to channel 16 via chanel 18. Within channel 18 may be fitted a restriction 21 as shown in FIGURE 3 so that pressure in channel 16 can vary from the pressure of source 19. The fluid supplied by source 19 is preferably air, but may alternatively be another gas or liquid. The other end 25 of channel 16 is connected via the conduit 22 to some utilization means 23 which can be a pure fluid amplifier, a fluid pulse counter, or a fluid-to-electrical transducer.

As best shown in FIGURE 3, disc 10 is provided with a group of ports $24_1$ through $24_N$ circumferentially arranged near its periphery. Each port 24 extends through the entire thickness of disc 10 and is disposed parallel to the center of shaft rotation. The distance of each port 24 from the shaft is such as to cause it to be aligned with port 17 in block 14 sometime during a complete rotation of disc 10. Each port 24 and the port 17 are of a size with respect to one another so that only one port 24 at most can be in alignment with port 17 at any particular instant of shaft rotation. However, the spacing between adjacent ports 24 in disc 10 is also preferably at least equal to the width of port 17 so that the latter is effectively blocked by disc 10 at other instants of rotation. FIGURE 3 shows port 17 to be blocked at a particular instant of rotation, whereas FIGURE 1 illustrates the alignment of one of the ports 24 with port 17.

In a typical application of the device of FIGURES 1 through 3, the environment external to disc 10 and block 14 is atmospheric at the usual pressure of 14.7 lbs. per sq. inch. Thus, ports 24 permit selective communication between the external environment and internal channel 16 as disc 10 rotates. At other times, as shown in FIGURE 3, disc 10 effectively blocks channel 16 from communicating with the external environment. Source 19 provides fluid, such as air, at a pressure such that the pressure in channel 16, during the times that port 17 is blocked, is greater than the pressure of the external environment. This pressure is communicated to utilization device 23 where it may be used as a control to deflect a power jet stream into a particular output channel of a pure fluid amplifier. Alternatively, device 23 can be a pure fluid counter for counting pressure pulses. When a port 24 rotates into alignment with port 17, communication is thereby effected between channel 16 and the lower pressure of the external environment. This reduces the resistance offered to the fluid emerging into channel 16 from conduit 20 and so increases its velocity with an attendant decrease in pressure. This decreased pressure in channel 16 is transmitted via conduit 22 to device 23 where it may allow a power jet stream to now flow into an output channel differing from said particular output channel. Thus, as the ports 24 are rotated successively into alignment with port 17, a series of pressure pulses are generated at output orifice 25 which may, in turn, be counted by pure fluid or other means in order to render a precise indication of angular position from an arbitrarily fixed reference point. However, it is to be further understood that the application of counting the pulses generated from the instant invention is not meant to be restrictive of its use. For example, the invention can also be used in frequency comparison where it is desired to maintain synchronism between two or more separate sections of a given process. Other uses of the invention will also be apparent to those skilled in the art.

A slight modification of the structure above described is shown in FIGURE 4. A port 26 in a fixed block 27 communicates with a channel 28 which in turn has introduced therein fluid from a source 29 via a conduit 30. As with block 14, the opposite surface of disc 10 is adjacent to the surface of block 27 so that port 26 is blocked at certain instants of rotation. At other times, a port 24 in disc 10 is brought into alignment with port 26 to allow communication between ports 26 and 17 via the aligned port 24. At this time, the fluid supplied by source 29 passes through port 24 and into channel 16 for application to utilization means 23 (not shown in FIGURE 4). This modification is particularly useful when the operating fluid of the system differs from that of the surrounding environment. However, in this case it may be necessary to provide a seal of some sort between the rotating disc and stationary blocks to prevent leakage.

FIGURES 5 and 6 show the second embodiment of the present invention. The basic difference between the two embodiments evolves from the vernier principle which provides the distinct advantage that a large number of pulses may be generated from a physically small unit. Referring now to FIGURES 5 and 6, there is shown a shaft 35 supported by a bearing 36 which prevents both axial and transverse shaft play. The end 37 of shaft 35 may be enlarged in diameter with a hole 38 being centrally bored therein from the end surface 39. By means of a rotary joint 40 and conduit 41, a fluid source 42 supplies fluid under pressure to hole 38, said fluid preferably being air but which may alternatively be another gas or a liquid.

Centrally bored hole 38 extends approximately to the center of the enlarged flange 37 where it is connected with three fluid channels or passageways 43, 44, and 45, each of which extends radially from hole 38 to ports on the periphery of flange 37. Concentric with flange 37 is an inner ring-like member 46 which is either shrunk or press-fitted onto the periphery of flange 37 so as to rotate therewith. This inner ring member 46 has an annular groove 47 located on its inner periphery adjacent to the periphery of flange 37. Groove 47 is located so that each of the radial channels 43, 44, and 45 terminates therein.

The inner ring member 46 further contains a series of radially drilled fluid channels 48 the number of which is determined by the requirements of the particular application. In the embodiment of FIGURES 5 and 6, there are twelve channels 48 designated at $48_1$ through $48_{12}$. Each extends from the common annular groove 47 to the outer periphery of ring 46. As mentioned before, the inner ring 46 coupled with the shaft 35 comprise the rotating assembly of the pulse generator.

Concentric with inner ring 46 is a stationary outer ring 49 containing a series of radially drilled passageways 50. According to the vernier principle employed herein, if the number of holes 48 equals N, the number of holes 50 must equal $N+1$. In FIGURES 5 and 6 therefore, there are thirteen of the passageways 50 designated as $50_1$ to $50_{13}$. Each channel 50 terminates at one on the inner periphery of outer ring 49. A sliding contact is maintained between the ring 49 inner periphery and the ring 46 outer periphery such that ring 46 slides within the stationary ring 49. Each channel 50 terminates in a common annular channel 51 which is drilled within ring 49 near its outer periphery. Connected at some point with channel 51 is a channel 52 which in turn may be connected to some utilization means 53 via a conduit 54. Utilization means 53 may be the same as that described for unit 23 in FIGURE 1.

When one of the channels 48 is aligned with one of the channels 50, a continous fluid path is opened from source 42 so as to transmit a pressure pulse to channel 52 and from there to utilization device 53. In FIGURE 5, it is noted that channel $48_1$ is exactly aligned with channel $50_1$ at one particular instant of rotation of shaft 35. In addition to the above defined relationship between the number N of channels 48, and the number $N+1$ of channels 50, the diameters of these channels should be such that there can be only one alignment at any one instant of rotation of shaft 35. If the inner ring 46 rotates counterclockwise from the position shown in FIGURE 5, channel $48_1$ moves out of alignment with channel $50_1$, while channel $48_2$ moves into alignment with channel $50_2$. There preferably is a small increment of rotation after channel $48_1$ moves out of alignment with channel $50_1$ and before channel $48_2$ moves into alignment with channel $50_2$, so that the pressure in output channel 52 is reduced to its quiescent value in order that the pulses generated therein may be articulated from each other. In identical fashion, if the shaft is further rotated counterclockwise, channel $48_2$ moves out of alignment with channel $50_2$ so as to once again reduce the pressure in channel 52. Further rotation of the shaft now brings channel $48_3$ into alignment with channel $50_3$ and the pressure is once again increased in output chanel 52. Consequently, it will be observed that during the angular displacement of 360/13°, twelve pulses are generated in output channel 52. Each of the foregoing twelve pulses therefore represents the fine measurement of angular displacement. One complete shaft rotation occurs when $12 \times 13$ pulses are counted, since there are thirteen of the channels 50. Where different applications of this embodiment of the invention require different numbers N and $N+1$ of the channels 48 and 50, respectively, then the following generalized equation may be used to determine the net angular displacement.

$$\text{Degrees of rotation} = \text{Number of pulses} \times \frac{360}{N(N+1)}$$

FIGURES 7, 8, and 9 show a modification of this second embodiment, said modification also utilizing the vernier principle. In some ways, this embodiment is quite similar to the embodiment of FIGURES 1, 2, and 3. A disc 60 is keyed to a rotating shaft 61 which in turn is supported by a bearing 62 and the fixed block 63. Disc 60 is provided with a series of ports $64_1$ through $64_{12}$ which are arranged about the center of rotation near the disc periphery. These ports are drilled completely through disc 60 and are parallel with the axis of rotation. A similar set of channels $65_1$ through $65_{13}$ is provided in the fixed block 63, each channel 65 being ported on the surface of block 63 which is adjacent one surface of disc 60. The other end of each channel 65 terminates in a common annular channel 66 which is formed in block 63. A single output channel 67 is connected to some point along the circumference of channel 66, while the other end of channel 67 is connected via a conduit 68 to some utilization means 69 which may be of the form described in connection with FIGURE 1. A channel 70 may be connected into channel 67 for the purpose of entering fluid therein via a pressure source not shown in FIGURE 7 but similar to source 19 in FIGURE 2. Channel 70 may also have a restriction therein as shown by 21 of FIGURE 2.

In operation, disc 60 rotates so that ports 64 are successively brought into alignment with channels 65. For each such alignment, communication is thereby effected between the output channel 67 and the external environment surrounding disc 60. Consequently, the pressure in channel 67 is reduced in conduit 68. The vernier principle has already been explained in connection with FIGURES 5 and 6.

While the preferred embodiments have shown the use of a rotating disc on a shaft, it may be that other environments require a precise indicator of linear position from a reference point. For these cases, ports 24 in FIGURE 1 (for example) may be formed in a straight line within a body having rectilinear motion with respect to port 17. Therefore, it is apparent that many modifications can be made without departing from the spirit of the invention as defined in the appended claims.

I claim:
1. Fluid apparatus which comprises:
  (a) a first body having a surface containing N equally spaced first ports therein arranged in a first circle with each in constant communication with fluid at a first value of pressure for a condition of equilibrium;
  (b) a second body having a surface containing $N+1$ equally spaced second ports therein arranged in a second circle with each in constant communication with fluid at a second value of pressure for said equilibrium differing from said first pressure value, said second body surface being adjacent to said first body surface, where all of said first and second ports are of equal diameter and the spacing of said second ports is less than the spacing of said first ports by at least the diameter of one port;
  (c) first means for permitting relative angular displacement between said surfaces about the center of said circles such that successive registrations of different pairs of first and second ports can occur one at a time to thereby upset said equilibrium during each said registration; and
  (d) a second means responsive to each said equilibrium upset.

2. Fluid apparatus according to claim 1 wherein said ported surfaces are cylindrical and concentric about the center of angular displacement.

3. Fluid apparatus according to claim 1 wherein said second body comprises a circular ring-like member having said second ports radially opening on its inner peripheral surface, and said first body comprises a circular disc-like member having said first ports radially opening on its outer peripheral surface, and disc member being inserted within said ring member such that the two can have displacement relative to one another about an axis perpendicular to their common centers.

4. Fluid apparatus which comprises:
  (a) a rotatable shaft having an axially bored fluid conducting conduit therein, one end of which is adapted for external connection and the other end of which terminates in at least one fluid passageway radially extending from said conduit to the periphery of said shaft;
  (b) an inner ring-like member having an annular groove in its inner peripheral surface, and N fluid channels each radially extending from said groove to an individual one of N ports equally spaced about its outer peripheral surface, where said inner ring is fixedly secured on the periphery of said shaft such that said fluid passageway of the latter terminates in said annular groove of the former; and
  (c) an outer ring-like member having an annular channel therein, $N+1$ fluid channels each rapidly extending from said annular channel to an individual one of $N+1$ ports equally spaced about its inner peripheral surface, and a fluid conduit one end of which is connected to said annular channel and the other end of which is adapted for external connection, where the inner peripheral surface of said outer ring is slidably concentric with the outer peripheral surface of said inner ring such that the ports in one can come into registration with the ports in the other, with all of said ports being of the same diameter and the spacing of said outer ring ports being less than the spacing of the inner ring ports by at least the diameter of one port.

5. Fluid apparatus which comprises:
  (a) a first body having a surface containing a group of spaced apart first ports therein with each in constant communication with fluid at a first value of pressure for a condition of equilibrium;
  (b) a second body having a surface containing a group of spaced apart second ports therein with each in constant communication with fluid at a second value of pressure for said equilibrium differing from said first pressure value, said second body surface being adjacent to said first body surface;
  (c) first means for permitting relative displacement between said surfaces such that each said first port can be placed into registration with said second ports one at a time in order to thereby upset said equilibrium during each said registration, where said first ports are arranged with respect to said second ports such that during relative displacement there can be only one registration at any one time of a pair of first and second ports both different from the pair of first and second ports of the immediately preceding timewise registration; and
  (d) a second means responsive to each said equilibrium upset.

6. Fluid apparatus according to claim 5 wherein said first means includes a rotatable shaft in which one of said bodies is affixed.

7. Fluid apparatus according to claim 5 wherein said first ports are equally spaced apart.

8. Fluid apparatus according to claim 5 wherein there are N second ports and $N+1$ first ports, all of equal diameter, and the spacing of said first ports is less than the spacing of said second ports by at least the diameter of one port.

9. Fluid apparatus according to claim 8 wherein said first ports are equally spaced apart.

References Cited by the Examiner

UNITED STATES PATENTS

| 1,440,224 | 12/22 | Kasley | 137—82 X |
| 1,702,982 | 2/29 | Scroder | 251—208 X |
| 2,646,813 | 7/53 | Mueller | 137—82 X |
| 2,781,056 | 2/57 | Carufel | 137—625.15 X |
| 2,904,070 | 9/59 | Lynott | 137—552.5 |
| 2,982,902 | 5/61 | Le Gates | 137—83 X |
| 3,057,375 | 10/62 | Etter | 137—552.5 |
| 3,063,468 | 11/62 | Dufor | 137—625.42 X |

FOREIGN PATENTS

| 1,162,936 | 4/58 | France. |
| 1,180,167 | 12/58 | France. |
| 144,895 | 1/31 | Switzerland. |

MARTIN P. SCHWADRON, Acting Primary Examiner.

WILLIAM F. O'DEA, Examiner.

UNITED STATES PATENT OFFICE
CERTIFICATE OF CORRECTION

Patent No. 3,202,180                          August 24, 1965

James L. Gray

It is hereby certified that error appears in the above numbered patent requiring correction and that the said Letters Patent should read as corrected below.

Column 5, line 58, for "and disc" read -- said disc --.

Signed and sealed this 19th day of April 1966.

(SEAL)
Attest:

ERNEST W. SWIDER                          EDWARD J. BRENNER
Attesting Officer                           Commissioner of Patents